United States Patent [19]

Smith, Jr.

[11] 4,146,340

[45] Mar. 27, 1979

[54] CALIBRATED REPLACEMENT TORQUE ROD

[75] Inventor: Joseph E. Smith, Jr., Birmingham, Mich.

[73] Assignee: Gulf & Western Manufacturing Company, Southfield, Mich.

[21] Appl. No.: 848,944

[22] Filed: Nov. 7, 1977

[51] Int. Cl.² .............................................. B62D 7/16
[52] U.S. Cl. ...................................... 403/27; 403/180; 74/586; 280/95 A
[58] Field of Search ................. 403/56, 180, 181, 122, 403/46, 13, 14, 77, 76, 271, 272, 27; 74/586; 280/95 A, 95 R

[56] References Cited

U.S. PATENT DOCUMENTS

| | | | |
|---|---|---|---|
| 2,238,870 | 4/1941 | Haynes | 403/56 X |
| 2,454,680 | 11/1948 | Stephens | 403/27 |
| 2,538,757 | 1/1951 | Bratthauer et al. | 403/43 X |
| 2,577,167 | 12/1951 | Vlasis | 403/44 X |
| 2,584,687 | 2/1952 | Fidler | 74/586 |
| 3,938,822 | 2/1976 | Guerriero | 280/95 R |

FOREIGN PATENT DOCUMENTS 1434219 2/1966 France ............................. 280/95 R

*Primary Examiner*—Andrew V. Kundrat
*Attorney, Agent, or Firm*—Barnes, Kisselle, Raisch & Choate

[57] ABSTRACT

A torque rod replacement assembly which includes ball joint assemblies, each having a projection arm, one of which telescopes into the other, weld slots being provided for permanent assembly, and graduation being provided on the telescoping parts to facilitate accurate adaptation to a vehicle being serviced.

3 Claims, 3 Drawing Figures

CALIBRATED REPLACEMENT TORQUE ROD

This invention relates to a Calibrated Replacement Torque Rod and more particularly to an assembly which can be utilized to replace torque rods of varying lengths.

Reference is made to copending application of Donald R. Gaines, Jon M. Smallegan, and William H. Trudeau on a "Replacement Torque Rod Assembly," Ser. No. 787,667, filed Apr. 15, 1977, and assigned to a common assignee.

The present device is an improvement in torque rod assemblies which are used for replacement and repair. Because of the large variety of motor vehicles in today's market and the size differentials from mini-cars, to large off highway equipment, it has been difficult for garages to stock the large number of torque rods necessary to fit each particular model. The object of the present invention is the provision of a torque rod assembly which can be readily used by mechanics without special training.

A further object is a simplified device having just two parts, one being calibrated to assist in attaining the proper length of rod, and the other being apertured to allow a welding operation which unifies the parts in a solid member.

Other objects of the invention will be apparent in the following description and claims in which the invention is set forth together with details to enable those skilled in the art to practice the invention, all in connection with the best mode presently contemplated for the invention.

Figure 1:
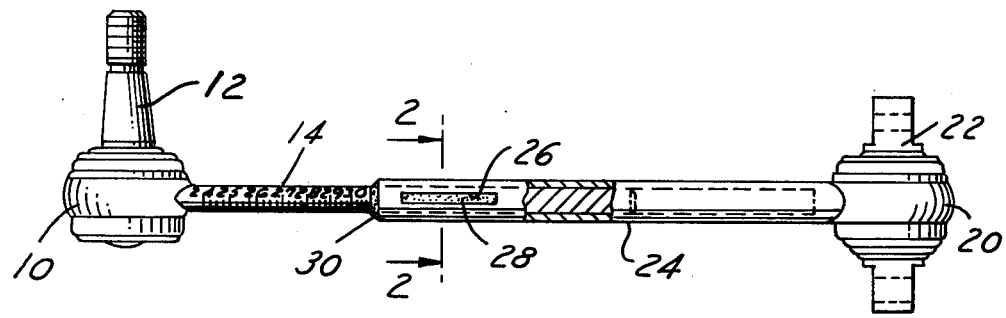

Drawings accompany the disclosure and the various views thereof may be briefly described as:

FIG. 1, an assembly view of the invention.

Figure 2:
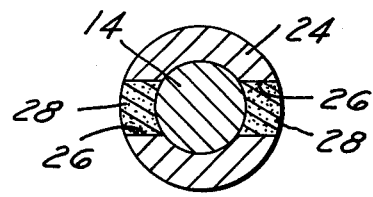

FIG. 2, an enlarged sectional view on line 2—2 of FIG. 1.

Figure 3:
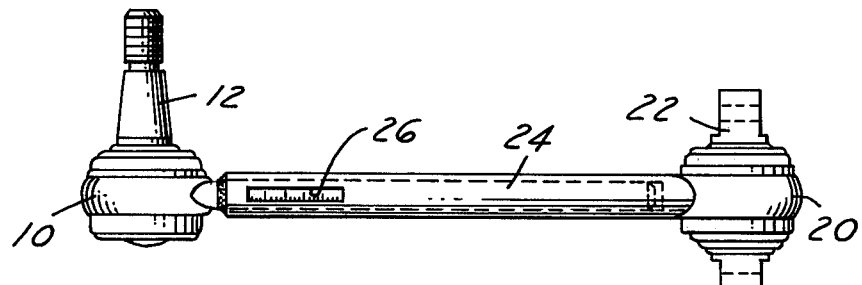

FIG. 3, an assembly illustrating a shorter length assembly and the welding slots.

With reference to the drawings, in FIG. 1, a ball joint assembly at the left includes a body 10 and a ball stud 12. Extending outwardly of the body 10 is a solid rod 14 disposed normal to the ball stud. The rod has lineal graduations with inch or metric dimensional marking to facilitate exact lengths when the assembly is being adapted to a particular vehicle.

At the right side of FIG. 1 is a second ball joint assembly having a body 20 with a double ended straddle ball 22. Extending outwardly of the body 20, normal to the studs of the double ended straddle ball 22, is a hollow tube 24 having slot windows 26 extending axially near the distal end. The rod 14 has a sliding fit with the bore of the tube 24.

As one example, the assembly in FIG. 1 has a center-to-center length of about 31" and the rod 14 is welded to the tube 24 through the windows 26 at 28 and also at the end of tube 24 at 30. As another example, the assembly in FIG. 3 is moved to a center-to-center dimension of 24". The windows 26 of FIG. 3 are not yet welded in so it will be seen that the graduations can be observed therethrough as the part is moved to a measured length. The measurement is, of course, from the end of the tube 24. The overall center-to-center dimension, as one example, can vary from 40" to 24" which will permit installation on most passenger vehicles and trucks in the present market.

What I claim is:

1. A vehicle rod replacement assembly comprising:
   (a) a pair of movable joint assemblies,
   (b) a hollow tube permanently secured to and extending from one of said joint assemblies having an axial bore,
   (c) a rod permanently secured to and extending from said other joint assembly having a series of lineal graduations thereon, said rod having in assembly a freely slidable, unrestrained fit with the axial bore of said tube, and
   (d) welds at adjoining surfaces of said tube and rod to secure said parts in a permanent longitudinal relationship at a selected dimension whereby said joint assemblies are properly spaced for assembly into a vehicle suspension system.

2. A vehicle rod replacement assembly comprising:
   (a) a pair of movable joint assemblies,
   (b) a hollow tube permanently secured to and extending from one of said joint assemblies having an axial bore, said tube having axial slots in walls thereof positioned toward the distal end,
   (c) a rod permanently secured to and extending from said other joint assembly having a series of lineal graduations thereon visible through said axial slots, said rod having in assembly a freely slidable, unrestrained fit with the axial bore of said tube, and
   (d) welds extending through said slots to secure adjoining surfaces of said tube and rod in a fixed and permanent longitudinal spaced relationship at a selected dimension whereby said joint assemblies are properly spaced for assembly into a vehicle suspension system.

3. A fixed dimension replacement rod assembly for field replacement in vehicles which comprises:
   (a) a first movable joint having a first containing body and a fastening stud extending axially therefrom movable relative to the body and a first elongate member permanently secured at a proximal end to and extending radially from the containing body,
   (b) a second movable joint having a second containing body and a fastening stud extending axially therefrom movable relative to the body and a second elongate member permanently secured at a proximal end to and extending radially from the second containing body,
   (c) said first and second elongate members being dimensioned to have in assembly a freely slidable unrestrained axial telescoping relation, the outer of said members having one or more axial slots through the wall thereof spaced from the digital end thereof, and
   (d) welds to secure said elongate members in a permanent fixed predetermined longitudinal relationship to establish a permanent lineal dimensional spacing between said movable joint bodies to accommodate to a particular vehicle suspension application comprising an encircling weld between the end of the outer of said telescoping members and the inner member, and a puddle weld in said slot welding said outer member to the outer surface of said inner member in an area spaced from said encircling weld.

* * * * *